United States Patent
Acher (10) Patent No.: US 11,290,973 B2
(45) Date of Patent: Mar. 29, 2022

(54) DEVICES, METHODS, AND COMPUTER PROGRAMS FOR DETERMINING AND TRANSFERRING A TIME BASIS IN A MOBILE COMMUNICATION SYSTEM, SYSTEM FOR SYNCHRONOUS SCANNING

(71) Applicant: SMART MOBILE LABS AG, Munich (DE)

(72) Inventor: Georg Acher, Munich (DE)

(73) Assignee: Smart Mobile Labs AG, Munich (DE)

( * ) Notice: Subject to any disclaimer, the term of this patent is extended or adjusted under 35 U.S.C. 154(b) by 72 days.

(21) Appl. No.: 16/608,208

(22) PCT Filed: Mar. 22, 2018

(86) PCT No.: PCT/EP2018/057309
§ 371 (c)(1),
(2) Date: Oct. 25, 2019

(87) PCT Pub. No.: WO2018/197119
PCT Pub. Date: Nov. 1, 2018

(65) Prior Publication Data
US 2021/0099966 A1    Apr. 1, 2021

(30) Foreign Application Priority Data

Apr. 25, 2017 (DE) .......................... 102017108765.6

(51) Int. Cl.
*H04W 56/00* (2009.01)
*H04J 3/06* (2006.01)

(52) U.S. Cl.
CPC ....... *H04W 56/0015* (2013.01); *H04J 3/0638* (2013.01)

(58) Field of Classification Search
CPC ............................................... H04W 56/0015
See application file for complete search history.

(56) References Cited

U.S. PATENT DOCUMENTS 9,357,514 B2 * 5/2016 Zou ................... H04W 56/0015
2003/0064752 A1 * 4/2003 Adachi ................. H04W 92/20
455/560

(Continued)

FOREIGN PATENT DOCUMENTS

WO        2016023589 A1    2/2016

*Primary Examiner* — Jason E Mattis
(74) *Attorney, Agent, or Firm* — 2SPL Patent Attorneys PartG mbB; Kieran O'Leary (57) ABSTRACT

Embodiments provide devices, methods and computer programs for determining and transmitting in a mobile communication system and a system for time-synchronous sampling. A device (10) is adapted for determining a time base in a mobile transceiver (100) in a mobile communication system (300). The mobile communication system (300) comprises at least one base station transceiver (200) and the mobile transceiver (100) is configured to exchange information in repeating radio frames with the base station transceiver (200). The device (10) includes at least one interface (12) configured to communicate with the at least one base station transceiver (200) of the mobile communication system (300). The device further (10) comprises a control module (14), which is configured to control the at least one interface (12), to establish synchronization with the repeating radio frames, incrementally increment a counter, and receive a message from the at least one base station transceiver (200). The message includes information on a local time reference at the base station transceiver (200). The control module (14) is further configured to adapt the counter based on the information on the local time reference and thus determine the time base.

9 Claims, 4 Drawing Sheets

(56) References Cited

U.S. PATENT DOCUMENTS

| | | |
|---|---|---|
| 2007/0213931 A1* | 9/2007 | Yoon .................... G01S 19/256 |
| | | 701/468 |
| 2009/0006882 A1 | 1/2009 | Manapragada et al. |
| 2011/0216660 A1 | 9/2011 | Lee et al. |
| 2012/0020417 A1 | 1/2012 | Wei et al. |
| 2013/0235864 A1* | 9/2013 | Do ......................... H04W 4/02 |
| | | 370/350 |
| 2013/0343365 A1 | 12/2013 | Hollabaugh et al. |
| 2015/0304975 A1* | 10/2015 | Shibuta ............ H04W 56/0015 |
| | | 370/328 |
| 2016/0034581 A1 | 2/2016 | Doan |
| 2016/0142988 A1* | 5/2016 | Powell ................. H04W 56/00 |
| | | 370/338 |
| 2016/0165558 A1 | 6/2016 | Kafle et al. |
| 2016/0345281 A1 | 11/2016 | Murray |
| 2017/0078996 A1* | 3/2017 | Shoihet ................ H04W 76/36 |

\* cited by examiner

DEVICES, METHODS, AND COMPUTER PROGRAMS FOR DETERMINING AND TRANSFERRING A TIME BASIS IN A MOBILE COMMUNICATION SYSTEM, SYSTEM FOR SYNCHRONOUS SCANNING

Embodiments provide devices, methods and computer programs for determining and transmitting in a mobile communication system and a system for time-synchronous sampling, in particular but not exclusively embodiments provide a concept for temporal synchronization of mobile transceivers based on a common time base transmitted from a base station.

Mobile communication systems always face new challenges: Modern smartphones (intelligent portable terminal devices) enable the use of a variety of new services, such as online navigation, music or video streaming, online communication and mobile internet. As these services often make up a large part of the functionality of a smartphone, network operators must try to achieve a widest possible coverage of a mobile communication system. In some applications, measurements are carried out from several mobiles, the measurement results of which are then subsequently merged again. Depending on the type of the measurements and the sampling rate, undesired effects may occur in the process if the measuring clocks of the measuring mobiles are not synchronous.

Thus, there is a demand to provide an improved concept for the synchronization of measurements of mobile transceivers in a mobile communication system.

This requirement is satisfied by embodiments disclosed herein, including a device for determining a time base in a mobile transceiver, a device for transmitting a time base from a base station transceiver to a mobile transceiver, a system for time-synchronous sampling, a method for determining and transmitting a time base, as well as a computer program.

Embodiments are based on the realization that a sample clock (also referred to as sampling clock) should be synchronous on multiple devices in order to make high-quality digital measurements (for example audio recordings (audio samples), video recordings, etc.) with multiple devices. The sample clocks of the devices should therefore be merged, i.e. they should be permanently equal/identical in frequency and should have no or only a small phase deviation between the devices/channels. Temporal deviations of less than 1 µs would be desirable.

A further realization is that this effectively means that each device should sample an analog value at exactly the same time instant, just as it would be the case with a purely analog forwarding. With an unequal or a changing sample frequency, samples would be missing or be too many over time, and thus for example cracks or beats would result when multiple channels are merged. Although this could be compensated with adaptive resampling (sampling changes), this is, however, undesirable with high-quality recordings and afflicted with inaccuracies with asynchronous transmission.

Due to the demand for low phase offset, microphoning may be used exactly as in an analog way, i.e. sample delays are only caused by the propagation delays of the sound. With digital audio interfaces, such as S/PDIF (Sony/Philipps Digital Interface), AES/EBU 3 (Audio Engineering Society/European Broadcasting Union), MADI (Multichannel Audio Digital Interface), this requirement is met by distributing a central sample clock (=world clock) to all devices via cable. These derive their internal timings/sample clocks therefrom.

For audio devices which operate over asynchronous networks (e.g. Audio over Internet Protocol (IP)), this requirement may be extended somewhat. In addition to the purely electrical synchronous generation of the sample clocks, the knowledge of the numerical value related to an absolute time base may also be used. This means that each sample can be referenced to an absolute time.

So, in an asynchronous further processing of packets with sample data from multiple sources, exactly those samples of the same sample time instant (timestamps) may be selected, and thus sample synchronization can be achieved again.

Embodiments create a device for determining a time base in a mobile transceiver in a mobile communication system. The mobile communication system includes at least one base station transceiver and the mobile transceiver is configured to exchange information in repeating radio frames with the base station transceiver. The device includes at least one interface which is configured to communicate with the at least one base station transceiver of the mobile communication system. The device further includes a control module, which is configured to control the interface and to establish a synchronization with the repeating radio frames. The control module is further configured to incrementally increment a counter and to receive a message from the at least one base station transceiver. The message includes information on a local time reference at the base station transceiver. The control module is configured to adjust the counter based on the information on the local time reference and to thus determine the time base. Thereby, the local time reference may have a higher synchronization accuracy than the radio frames themselves, for example the accuracy may be $1/10000$, $1/5000$, $1/1000$, $1/500$ of the radio frame duration.

Embodiments further create a device for transmitting a time base from a base station transceiver to a mobile transceiver in a mobile communication system. The device includes at least one transceiver module which is configured to communicate with the at least one mobile transceiver. The device further includes a control module which is configured to control the transceiver module and to exchange information in repeating radio frames with the mobile transceiver via the transceiver module. The control module is further configured to send a message from the at least one base station transceiver to the mobile transceiver, wherein the message includes information on a local time reference relative to the repeating radio frames, thereby providing the time base.

Embodiments may thus enable a common time base between base station transceiver and mobile transceiver, which goes beyond a granularity of the radio frames themselves. This time base may be more accurate than the radio frames, see above.

In some further embodiments, the information on the local time reference may comprise an absolute time stamp and identification information on a radio frame in temporal relation to the absolute time stamp. Embodiments may thus enable synchronization relative to the radio frames and based on the absolute time stamp. For example, the control module in the device for the mobile transceiver may be configured to adjust the counter based on the absolute time stamp. In some embodiments, the absolute time stamp may be in the past. In other embodiments, the absolute time stamp may be in the future.

In some embodiments, the control module of the device for the mobile transceiver may be configured to determine information on a signal runtime between the base station transceiver and the mobile transceiver regarding the synchronization with the repeating radio frames. The control module may be further configured to take into account the information on the signal runtime when determining the time base. Embodiments may thus reduce or even eliminate inaccuracies caused by signal runtimes. The control module of the device for the mobile transceiver may be further configured to, based on the time base, sample or reproduce signal values and thus detect measurements synchronously with the time base of the base station transceiver and thus also synchronously with other mobile transceivers. The signal values may include audio or video signals, for example.

In embodiments, the information on the local time reference may be a time stamp according to the Precision Time Protocol (PTP).

Embodiments also create a system for time-synchronous sampling or reproducing of signals by means of two or more mobile transceivers of a mobile communication system. The system includes two or more mobile transceivers, each with one device according to the above description, and at least one base station transceiver with one device according to the above description.

Embodiments create a method for determining a time base in a mobile transceiver in a mobile communication system. The mobile communication system comprises at least one base station transceiver. The method includes communicating with the at least one base station transceiver of the mobile communication system and an exchanging of information in repeating radio frames with the base station transceiver. The method further includes establishing synchronization with the repeating radio frames, incrementally incrementing a counter, and receiving a message from the at least one base station transceiver. The message includes information on a local time reference at the base station transceiver. The method further includes determining the time base by adjusting the counter based on the information on the local time reference.

Embodiments create a method for transmitting a time base from a base station transceiver to a mobile transceiver in a mobile communication system. The method includes communicating with the at least one mobile transceiver, exchanging information in repeating radio frames with the mobile transceiver and providing the time base by sending a message from the at least one base station transceiver to the mobile transceiver. The message includes information on a local time reference relative to the repeating radio frames.

Embodiments further create a program/computer program having a program code for executing at least one of the above described methods when the program code is executed on a computer, a processor, a controller or a programmable hardware component. Embodiments also create a digital storage medium which is machine or computer readable and comprises electronically readable control signals which may cooperate with a programmable hardware component in such a manner that one of the above described methods is executed.

BRIEF DESCRIPTION OF THE FIGURES

In the following, further advantageous embodiments are explained in more detail with reference to the embodiments illustrated in the Figures to which embodiments are not generally restricted, however, in which.

DESCRIPTION

Various embodiments will now be described in more detail with reference to the accompanying drawings in which some example embodiments are illustrated. In the Figures, the thicknesses of lines, layers and/or regions may be exaggerated for clarity.

In the following description of the accompanying figures, which only show a few exemplary embodiments, like references may designate like or comparable components. Moreover, summarizing references may be used for components and objects that occur more than once in an embodiment or in a drawing, but are described together with regard to one or more features. Components or objects which are described with like or summarizing references may be identical with regard to individual, several or all features, for example their dimensioning, but may also be designed differently, provided that the description does not explicitly or implicitly state otherwise.

Although embodiments can be modified and altered in various ways, embodiments are illustrated as examples in the figures and are described in detail herein. However, it should be made clear that it is not the intention to limit embodiments to the respective forms disclosed, but rather that embodiments should cover all functional and/or structural modifications, equivalents and alternatives that lie within the scope of the invention. Like references refer to like or similar elements throughout the description of the figures.

It is noted, that an element which is referred to as being "connected" or "coupled" or "interconnected" to another element, may be directly connected or interconnected to the other element or that intervening elements may be present. If an element is referred to as being "directly connected" or "directly coupled" to another element, no intervening elements are be present. Other terms used to describe a relationship between elements ought to be interpreted likewise (e.g. "between" versus "directly between", "adjacent" versus "directly adjacent", etc.).

The terminology used herein only serves for the description of specific embodiments and should not limit the embodiments. As used herein, the singular form such as "a," "an" and "the" also include the plural forms, as long as the context does not indicate otherwise. It will be further understood that the terms e.g. "contain", "containing", "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any group thereof.

Unless otherwise defined, all terms (including technical and scientific terms) are used herein in their ordinary meaning of the art to which the examples belong and given to same by a person of ordinary skill in the art. It is further clarified that terms like e.g. those defined in generally used dictionaries are to be interpreted to have the meaning consistent with the meaning in the context of relevant technology and will not be interpreted in an idealized or overly formal sense unless expressly defined otherwise herein.

In some embodiments, time synchronization of the systems or components may be achieved by means of PTP (Precision Time Protocol, IEEE1588) in interaction with the time base. For example, PTP is also used with common standards such as AES67/Ravenna, Dante.

PTP may generally comprise additional hardware in the network chip and, with that, may reach accuracies in the range of less than 10 ns. The theoretical resolution is 1 ns at a time stamp format of 64 Bit. By means of PTP an absolute (numerical) time base is therefore directly available in each device, from which an electrically synchronous sample clock may be generated via (D)PLLs (Digital Phase Locked Loop). AES67 itself may transmit the sample data according to the RTP standard (Real Time Protocol, Standard RFC3550 (Request for Comments 3550)). The data packets include a successive sequence number, but no time stamp. At regular intervals, a packet with a past packet sequence number and a time stamp of the first sample in it is transmitted via a control channel (RTCP, Real Time Control Protocol) by means of a sender report (SR). Through that, each sample may be referenced to the time base again.

The audio requirements described mainly for embodiments may also be transferred to other applications, e.g. sample output, industrial measurement detection, video, etc. Due to the asynchronous nature of the network transmission, knowledge of a global time (the same/common for the devices involved) is required; this may be required for input and/or for synchronous output. In the following, embodiments in LTE (Long Term Evolution) and the succeeding standard 5G (5th Generation) are assumed to be related, i.e. known properties of LTE are highly likely to be included in 5G in a similar manner.

Figure 1:
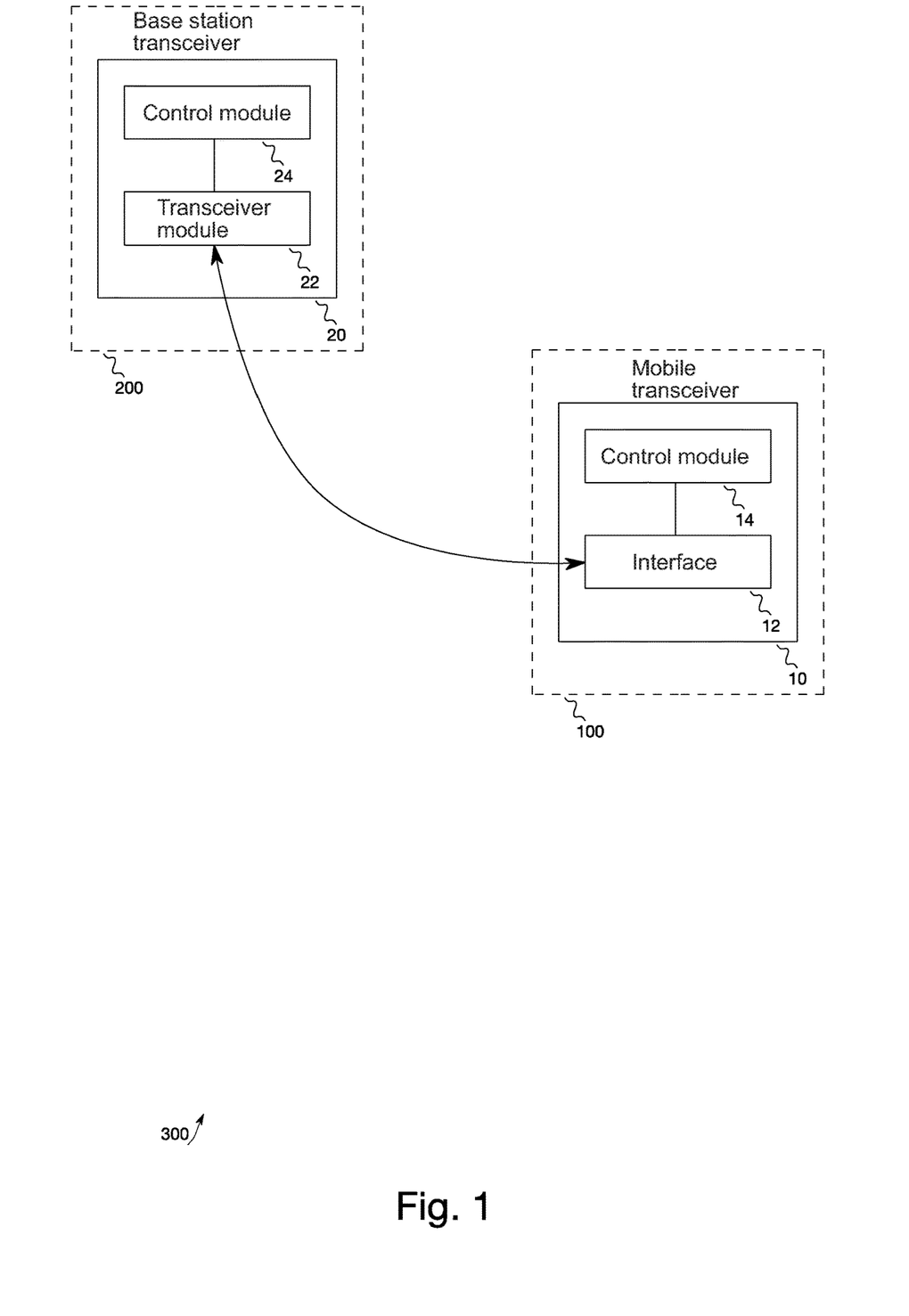
FIG. 1 shows block diagrams for an embodiment of a device for a mobile transceiver, an embodiment of a device for a base station transceiver, and an embodiment of a system.

FIG. 1 shows block diagrams for an embodiment of a device 10 for a mobile transceiver 100, an embodiment of a device 20 for a base station transceiver 200, and an embodiment for a system 300.

The device 10 is adapted for determining a time base in a mobile transceiver 100 in a mobile communication system 300. The mobile communication system 300 has at least one base station transceiver 200 and the mobile transceiver 100 is configured to exchange information (indicated by the two-way arrow) in repeating radio frames with the base station transceiver 200. The device 10 includes at least one interface 12 which is configured to communicate with the at least one base station transceiver 200 of the mobile communication system 300. The device 10 further includes a control module 14, which is configured to control the at least one interface 12 and to establish a synchronization with the repeating radio frames. The control module 14 is further configured to incrementally increment a counter and to receive a message from at least one base station transceiver 200. The message includes information on a local time reference at the base station transceiver 200. The control module 14 is further configured to adjust the counter based on the information on the local time reference and to thus determine the time base. The control module 14 is coupled with at least one interface 12. Embodiments also create a mobile transceiver 100 with an embodiment of the device 10.

The device 20 is adapted for transmitting a time base from the base station transceiver 200 to the mobile transceiver 100 in the mobile communication system 300. The device 20 includes at least one transceiver module 22 which is configured to communicate with the at least one mobile transceiver 100. The device 20 includes a control module 24 which is configured to control the transceiver module 22 and to exchange information in repeating radio frames with the mobile transceiver 100 via the transceiver module 22. The control module 24 is further configured to send a message from the at least one base station transceiver 200 to the mobile transceiver 100 and to thus provide the time base. Thereby the message includes information on a local time reference relative to the repeating radio frames. The control module 24 is coupled with the transceiver module 22. Embodiments also create a base station transceiver 200 with an embodiment of the device 20. Thereby, the local time reference may be accurate to within 1 ns, 5 ns, 10 ns, 50 ns, 100 ns, etc., for example. Embodiments also allow communication between two base station transceivers so that also multiple base station transceivers may be synchronized with each other. As soon as multiple base station transceivers are synchronous with each other, multiple mobile transceivers may be synchronized accordingly, even if these are associated with different base station transceivers.

Embodiments further create a system 300 for time-synchronous sampling or reproducing of signals by means of two or more mobile transceivers 100. The system 300 includes the two or more mobile transceivers 100 each with a device 10 and at least one base station transceiver 200 with a device 20.

In embodiments, the interface 12 may be configured as any wired or, in some embodiments, wireless interface 12, which permit the exchange of data. Analog and digital implementations may occur and the interface 12 may be implemented as one or more contacts, registers, conductors, etc. In some embodiments, the interface 12 may also be an interface to a transceiver module, which is configured for wireless communication with the base station transceiver 200. In principle, the device 10 may also be implemented for wired communication and the interface 12 may serve for communication with other components in a mobile transceiver, for example with a radio modem (transceiver module).

The transceiver module 22, and also any transceiver module on the side of the mobile transceiver 100, may thereby comprise typical transmitter or receiver components. Among the same there may, for example, be one or more antennas, one or more filters, one or more mixers, one or more amplifiers, one or more diplexers, one or more duplexers, radio modem etc. In embodiments, the control modules 14, 24 may correspond to any controller or processor or to a programmable hardware component. For example, the control modules 14, 24 may also be realized as software or a computer program, which is programmed for a corresponding hardware component. In this respect a control module 14, 24 may be implemented as programmable hardware with accordingly adapted software. Here, any processors may be used, like digital signal processors (DSPs). Embodiments are not restricted to a certain type of processor here. Any processors or also several processors are conceivable for implementing the control modules 14, 24.

In embodiments, the system, mobile radio system or mobile communication system 300 may correspond, for example, to one of the mobile radio systems standardized by appropriate standardization boards, such as the 3rd Generation Partnership Project (3GPP) group. For example, the same include the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), like e.g. the Universal Mobile Telecommunication System (UMTS), Long Term Evolution (LTE) or LTE-Advanced (LTE-A), 5th generation (5G) systems or also mobile radio systems of different standards like e.g. the Worldwide Interoperability for Microwave Access (WIMAX), IEEE802.16 or Wireless Local Area Network (WLAN), IEEE802.11, as well as in general any system based on a Time Division Multiple Access (TDMA), Frequency Division Multiple Access (FDMA), Code Division Multiple Access (CDMA), Orthogonal Frequency Division Multiple Access (OFDMA) or any other technology and/or multiple access method. In the following, the terms mobile radio system, mobile radio net, mobile communication system and mobile radio network are used synonymously.

In the following, it is assumed that such a mobile radio system includes at least one stationary transceiver in the sense of a base station or base station transceiver 200 which has a connection to the wired part of the mobile radio network. On the other hand, it is assumed that the mobile radio network includes at least one mobile transceiver 100 (mobile radio terminal device, radio modem), wherein the term mobile here refers to communication with this transceiver happening via the air interface, i.e. wirelessly. Such a mobile transceiver may, for example, correspond to a portable telephone, a smartphone, a tablet computer, a portable computer or a radio module which is not necessarily mobile in the sense that it actually moves in relation to its surroundings. The transceiver may also be stationary (e.g. relative to a car), but may communicate wirelessly with the mobile radio network. In this respect, the already mentioned base station may correspond to a base station of one of the above-mentioned standards, for example a NodeB, an eNodeB, etc.

A base station transceiver or a base station (these terms may be used equivalently) may be configured to communicate with one or more active mobile radio devices and to communicate in or adjacent to a supply area of another base station transceiver or a base station, e.g. as a macro cell base station or a small cell base station. Thus, embodiments may include a mobile communication system with one or more mobile radio terminal devices and one or more base stations, wherein the base station transceivers may provide macro cells or small cells, e.g. pico, metro or femto cells. A mobile transceiver or mobile radio terminal device may correspond to a smartphone, a mobile phone, a user device, a radio device, a mobile, a mobile station, a laptop, a notebook, a personal computer (PC), a personal digital assistant (PDA), a stick or adapter of a universal serial bus (USB), an automobile, a car, a truck, motorcycles, bicycles, trains, airplanes, ships, any aircrafts, landcrafts and watercrafts, etc. A mobile transceiver may also be called user equipment (UE) or mobile according to 3GPP terminology.

A base station transceiver or a base station may be located in a stationary or at least firmly connected part of the network or system from the point of view of a mobile radio terminal device. A base station transceiver or a base station may also correspond to a remote radio head, a relay station, a transmission point, an access point, a radio device, a macro cell, a small cell, a micro cell, a femto cell, a metro cell etc. A base station or a base station transceiver is thus regarded as a logical concept of a node/a unit for providing a radio carrier or radio connections via the air interface via which a terminal device/mobile transceiver gets access to a mobile radio network.

A base station or base station transceiver may represent a wireless interface for mobile radio terminal devices to a wired network. The used radio signals may be 3GPP-standardized radio signals or in general radio signals according to one or more of the above-mentioned systems. Thus, a base station or base station transceiver may correspond to a NodeB, an eNodeB, a Base Transceiver Station (BTS), an access point, a Remote Radio Head, a transmission point, a relay station, etc. which may be divided into further functional units.

A mobile radio terminal device or a mobile transceiver may be allocated to a base station or cell or be registered at the same. The term cell refers to a coverage area of the radio services provided by a base station, e.g. by a NodeB, an eNodeB, a Remote Radio Head, a transmission point, a relay station, etc. A base station may provide one or more cells on one or more carrier frequencies. In some embodiments a cell may also correspond to a sector. For example, sectors may be formed with sector antennas which are configured for covering an angular section around an antenna location. In some embodiments a base station may, for example, be configured for operating three or six cells or sectors (e.g. 120° in case of three cells and 60° in case of six cells). A base station may include several sector antennas. In the following the terms cell and base station may also be used synonymously.

In other words, in the embodiments, the mobile communication system may also include a heterogeneous cell network (HetNet) having different cell types, e.g. closed subscriber group (CSG) cells and open cells, as well as cells of different sizes, such as macrocells and small cells, wherein the coverage area of a small cell is smaller than the coverage area of a macrocell. A small cell may correspond to a metro cell, a micro cell, a pico cell, a femto cell, etc. The coverage areas of the individual cells are provided by the base stations for their service regions and depend on the transmission powers of the base stations and the interference conditions in the respective area. In some embodiments, the coverage area of a small cell may be at least partially surrounded by a service area of another cell, or partially coincide or overlap with the service area of a macro cell, for example. Small cells may be used to expand the capacity of the network. A metro cell may therefore be used to cover a smaller area than a macro cell, e.g. metro cells are used to cover a road or a section in a conurbation. For a macro cell, the coverage area may have a diameter of the order of one kilometer or more, e.g. along motorways also 10 km or more, for a micro cell, the coverage area may have a diameter of less than one kilometer and a pico cell may have a coverage area with a diameter of less than 100 m. A femtocell may have the smallest coverage area and it may be used to cover a household, automotive or gate area at the airport, for example, i.e. its transmission area may have a diameter of less than 50 m.

Embodiments may allow for (audio) synchronization via LTE/5G radio networks without major intervention with the standard or the receiving hardware. For that, a most accurate possible reference time (local reference time at the base station transceiver 200) is transmitted to the terminal device (terminal, mobile transceiver 100). With regards to hardware, this time value is available/processable in the terminal in such a way that the above requirements can easily be met. Embodiments may be "minimally invasive" in this case, i.e. require no or only minor interventions in existing receiver hardware. Embodiments may therefore possibly cause no or only little additional hardware implementation costs. Embodiments may make use of universal interfaces, for example to software or to audio hardware.

In some further embodiments the control module 14 is configured to obtain, as information on the local time reference, an absolute time stamp and identification information on a radio frame in temporal relation to the absolute time stamp. In embodiments, the radio frames may correspond to a temporal grid, into which communication via the air interface is divided. Here, time slots, frames, sub-frames, hyper-frames, system frames, etc. may be distinguished, for example.

LTE, for example, defines a so-called System Information Block SIB #16. This transmits the time as UTC (Universal Time Coordinated) with second resolution. SIBs are transmitted asynchronously, i.e. even if SIB16 is transmitted immediately after a second jump, it is unclear which time delay is in the transmission path and also on the receiver side. Therefore, the value cannot be more than "informative". Due to the relatively high latencies and unpredictable timing, PTP/NTP (Network Time Protocol) can only be used feasibly to a limited extent in a mobile radio scenario.

Base stations may already be synchronized with each other to a large extent by means of PTP, i.e. a precise time is already present there. But even without PTP, a very stable time base (via GPS or frequency standard) is used for generating the transmit frequency or the transmit timing. For example, LTE operates with 10 ms slots. At the beginning of each slot, a consecutive System Frame Number (SFN) is transmitted. With LTE, values 0 . . . 1023 are possible, i.e. the SFNs repeat after approx. 10 s. Each terminal may operate on the basis of an internal clock, e.g. from a crystal oscillator. Internal signal processing (receive frequency and high frequency (HF) sample clock) is coupled to this clock via PLLs (Phase Locked Loop) directly via a fixed factor.

During synchronization to the OFDM signal from LTE, correction values for the local receive frequency or the timing incur. These are (at least during standstill) a relatively accurate measure for a deviation of the local clock from the reference clock of the base station. This means that using these correction values the reference frequency of the base station may be recreated again electrically using (D)PLLs. A phase relation or a numerical absolute value is thereby not yet directly achievable. Embodiments may therefore use a real-time counter or real-time controller, RTC (Real Time Controller=Local register/counter of the global PTP time, e.g. in 1 ns, 5 ns, 10 ns, 50 ns, 100 ns, etc. resolution). The control module 14 may be configured to determine information on a signal runtime between the base station transceiver 200 and the mobile transceiver 100 with respect to the synchronization with the repeating radio frames. The control module 14 may be further configured to take into account the information on the signal runtime when determining the time base.

In the following, embodiments of algorithms are explained step by step:

0)

The RTC corresponds to the counter which is incremented incrementally. In an embodiment, the RTC is incremented with a local clock. For example, the increment value without corrections is 1/(local clock*RTC resolution). In addition, the correction factor known from the synchronization may be included via dithering or increased RTC counter accuracy.

1)

Once LTE synchronization has happened at the beginning of the slot, it may be determined in embodiments through deterministic DSP algorithms at which (local) time instant this slot actually began. This local time instant may be based e.g. on "Samples since turn-on" etc.

2)

After synchronization and decoding of the slot header (control information) has occurred, the SFN of the slot is also known.

3) Thus, the local time of the beginning of a certain SFN slot can also be determined (from 1+2) then. The control module 14 may then be configured to adapt the counter based on the absolute time stamp or to store it first. The control module 14 may be configured to store the local time determinable from 1) respectively for one or more specific (e.g. future, cf. 4b) or one or more arbitrary (e.g. already past, cf. 4a) SFN slots and to make them available later as association with the SFN to a local time.

4a)

In some further embodiments, an asynchronous message, which contains the exact PTP time stamp of one or more SFNs of the past, may now be sent from the base station transceiver via the LTE data channel (as SIB or IP packet). Then, the absolute time stamp is in the past.

4b)

In some embodiments, an asynchronous message, which contains the (probably) exact PTP time stamp of one or more SFNs of the future, may be sent from the base station transceiver via the LTE data channel. Since LTE timing is absolutely deterministic, "(probably)" is not a relevant limitation of accuracy. Then, the absolute time stamp is in the future.

With regards to implementation, embodiments of the first variant (4a, time stamp of the past) may be simpler and possibly also more precise. For example, the slot start detection in the base station transceiver may register the PTP time e.g. electrically only via a pulse output. The SFN number may then be supplied additionally later via software.

5a)

If the message 4a) (message from base station transceiver) comprises an SFN, the time of which has been determined in 3), its global time is known (plus any possible runtime/processing corrections). With the local time that has passed since then and the correction factor local/global known through synchronization, the current PTP time can also be determined. This value may then be written into the RTC register.

5b)

Message 4b) may be written into a comparative unit. If a suitable SFN arrives, the previously transmitted global time (+ possible correction due to runtime and processing delay) may be set directly in the RTC register.

5c)

As long as one remains in a valid/current SFN area, every other received SFN may be converted into a PTP-time using the deterministic LTE timing, also indirectly from a SFN/time stamp pair transmitted in a concrete fashion using 4).

In embodiments, the information on the local time reference may be a time stamp according to the Precision Time Protocol, both on the side of the base station transceiver and on the side of the mobile transceiver. The control module 14 may then be further configured to sample or reproduce signal values based on the time base.

The signal values may include audio or video signals, for example.

In some further embodiments, in order to avoid jumps in the RTC, all further updates may be done "smoothly" after the first initialization via changes in the increment factor using the RTC difference (PID regulator similar to PTP/NTP update mechanisms). The distance between the mobile transceiver 100 and the base station transceiver 200 creates additional runtime (Timing Advance=TA). LTE can determine it in 520 ns steps, since it is also required for sending. The TA value (or more precise distance determinations) is subtracted from the received PTP value in at least in some embodiments. A moving receiver may determine other correction values at the OFDM synchronization by means of the Doppler effect, which are also taken into account in some embodiments. There are methods for determining the speed from the channel data (crossing rate, correlation) which may be inserted into embodiments. Therefore, in some embodiments, the correction factor may either be determined during a longer standstill or adjusted via the algorithms for speed determination.

In some further embodiments, the RTC value is used for audio synchronization. A sample clock synchronous for all devices (mobile transceivers) may be obtained from "RTC modulo (sample clock in RTC steps)". A jitter filter (PLL etc.) may also be used. Reading out the RTC to determine the time instant for a specific sample can be made more precise by using dedicated hardware instead of a software solution. Hardware support may, for example, be realized analogously via so-called timer capture units, which are typically present in embedded CPUs (central processing units).

In some embodiments, such a capture unit stores the current RTC value when a certain event (trigger, e.g. rising edge) occurs. This trigger may e.g. be the sampling of the first value of a larger block of the audio unit. Thus, this event may either be supplied from the outside via a pin (audio unit also external) or may be obtained internally from the audio unit via a simple logic. The value of the capture register is later read out in software, e.g. when the audio unit has filled the block. Linked to the number of the block currently read, the RTCP transmitter reports may then be created in embodiments. For the synchronous output of samples, the RTC may be compared in hardware with a value previously determined from the software. If the RTC reaches/exceeds the value, the sample output may start with the previously shown sample clock generated.

Figure 2:
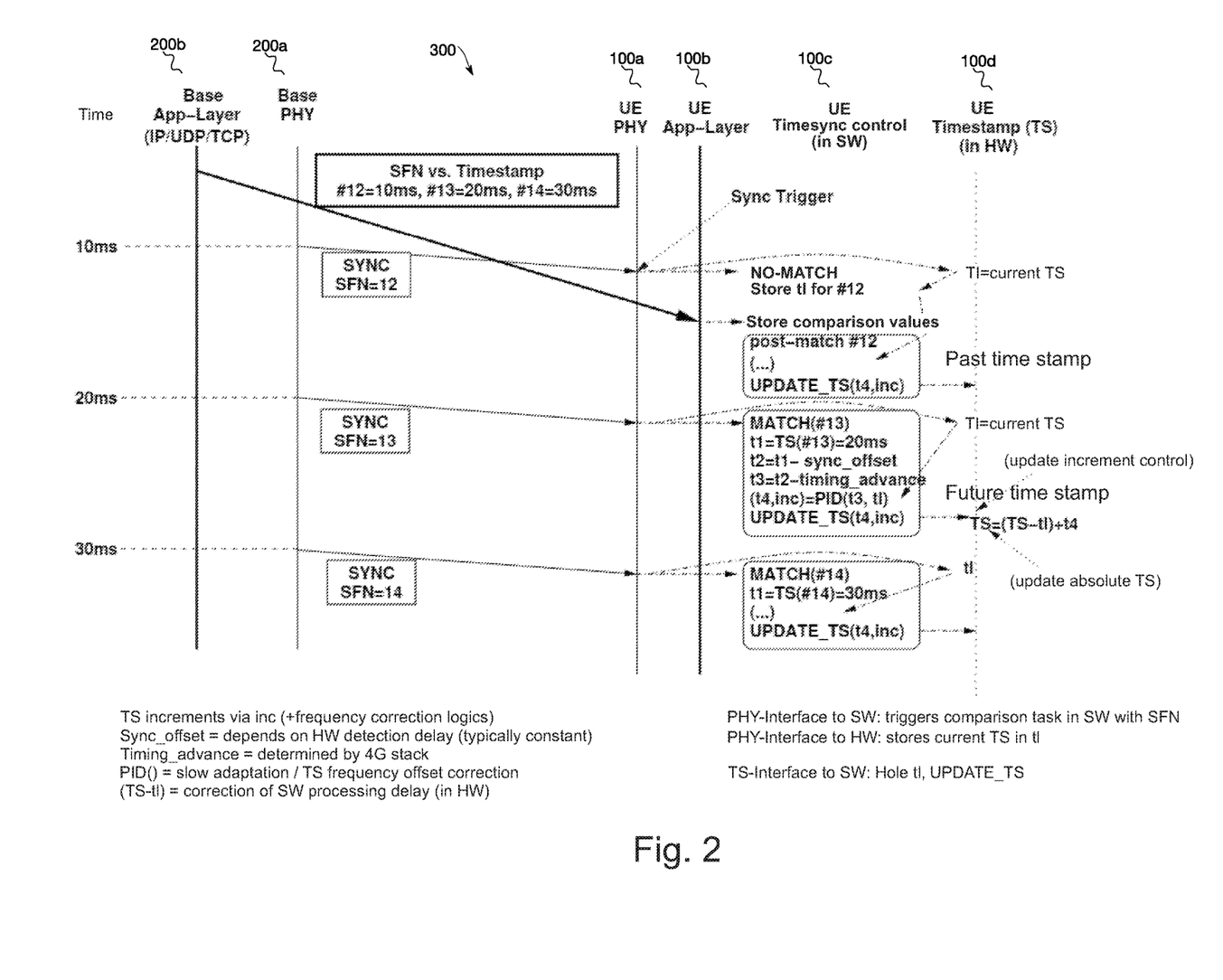
FIG. 2 shows a message sequence from an embodiment.

FIG. 2 shows a a message sequence and a method from an embodiment. FIG. 2 shows a temporal flow according to radio frames in an LTE system 300. A radio frame lasts 10 ms and in the chosen illustration the time progresses from top to bottom. FIG. 2 shows three consecutive radio frames, SFN=12, 13, 14, the limits of which are at the absolute times of 10 ms, 20 ms and 30 ms, from the base station transceiver's perspective. On the left side a base station transceiver 200 with a physical protocol layer "Base Phy" 200a and an application layer "Base App-layer" 200b is illustrated. Application layer 200b protocols in the base station transceiver may be IP, UDP (Universal Datagram Protocol) or TCP (Transport Control Protocol), for example. The physical protocol layer "UE-Phy" 100a and the application layer "UE App-layer" 100b of a mobile transceiver 100 are illustrated on the right side of FIG. 2. Furthermore, FIG. 2 shows the control of the time base of the mobile transceiver 100 with a software module "UE Timesync Control" 100c and a hardware module "UE Timestamp (TS)" 100d.

The time stamp TS comprises the local time (to be synchronized) and is continuously incremented via the value "inc", which depends on a frequency correction logic. The "sync_offset" depends on the detection delay caused by the hardware and is typically constant. The "timing_advance" is calculated within the framework of the 4G/LTE protocols. The function PID( ) smoothly or slowly tracks the value TS and may perform a frequency offset correction, for example based on the principles of a PID regulator (proportional, integrative, differential). In this embodiment, t1 is at least one hardware-implemented register on the side of the mobile, which is to be synchronized to the counter on the side of the base station transceiver and which caches the current value of the TS register without significant delay when a slot synchronization pulse arrives. The value (TS-tl) corresponds to the correction of the delay as processed by the software. The interface between PHY-interface 100a and the software hereby triggers a comparative or adjustment mechanism with the SFN for the counter value TS. The interface between PHY-interface 100a and the hardware stores the current TS value in tl. The interface between the software and the TS value allows for the TS value to be read out and updated.

As FIG. 2 shows, the base station transceiver sends the message with the time stamp, which is then stored on the side of the mobile transceiver 100, shortly before 10 ms and begin SFN 12. Thereby, a synchronization at radio frame level is triggered ("Sync Trigger" in FIG. 2) when the SFN limit reaches the mobile transceiver. Thereby, the counter value TS is placed in tl. After arrival of the message from the base station transceiver 200 it may be determined which time stamp (counter value) on the base station transceiver side belongs to the radio frame begin SFN 12. The counter value may then be adjusted retrospectively ("post-match #12, ( . . . ), UPDATE_TS(t4, inc)) at the mobile transceiver 100. In this variant, the timestamp refers to the past so that the difference between counter and timestamp in the past may be used to deduce the corresponding correction. For the transition to SFN 13, the counter value may be updated again, whereby the hardware processing delay "sync_offset" and the "timing_advance" may then be taken into account, this works accordingly if the time stamp is in the future:

"MATCH(#13),
t1=TS(#13)=20 ms,
t2=t1-sync_offset,
t3=t2-timing_advance,
(t4,inc)=PID(t3, tl),
UPDATE_TS(t4,inc))."

The following results as the new counter value $$TS=(TS-tl)+t4.$$

With this, the amount of the increment and the absolute time value can be controlled. In the following SFN 14 one may proceed analogously. In the case of future time stamps, adjustment may correspondingly be started in advance. FIG. 2 illustrates the flow of a synchronization between base station transceiver 200 and mobile transceiver 100. Thereby, two synchronization cases are indicated (timestamps for past as well as future SFNs). Thereby it is also shown that the management messages may run asynchronously at IP level and do not require exact timing. Furthermore, embodiments may also allow synchronization with past and future time stamps. This may be particularly useful in scenarios with varying delays.

It is also outlined which parts are implemented in hardware and which are implemented in software in this embodiment. The PID part is a regulation algorithm which includes the deviation of the own clock for the correction and the entire time progress in order to find and correct a systematic error of the local quartz (possibly also with the help of the results from the OFDM synchronization). This also allows for a continuous update to be done smoothly without major or non-monotonous time jumps.

Embodiments may enable an "economical" interface 12 between the actual modem (transceiver module) and the synchronization unit 10. In some embodiments only one trigger pulse is used for the sync time instant ("Sync Trigger") and one readable (later e.g. in software) SFN of this sync frame. Thus, time synchronization may also be realized as an extra chip outside the modem hardware.

In some further embodiments, when passing the time to an audio/sample hardware or measurement hardware in general, the trigger signal from the audio/sample hardware may be used to store current TS value. This may then be read out asynchronously later. The audio/sample hardware may then also reconstruct the real time from the current TS and the "internal" time for triggering the trigger pulse. This may possibly work more easily than in the LTE case, since everything runs locally with deterministic timing. That means that, at least in some embodiments, offset corrections or PID regulators may be omitted.

Figure 3:
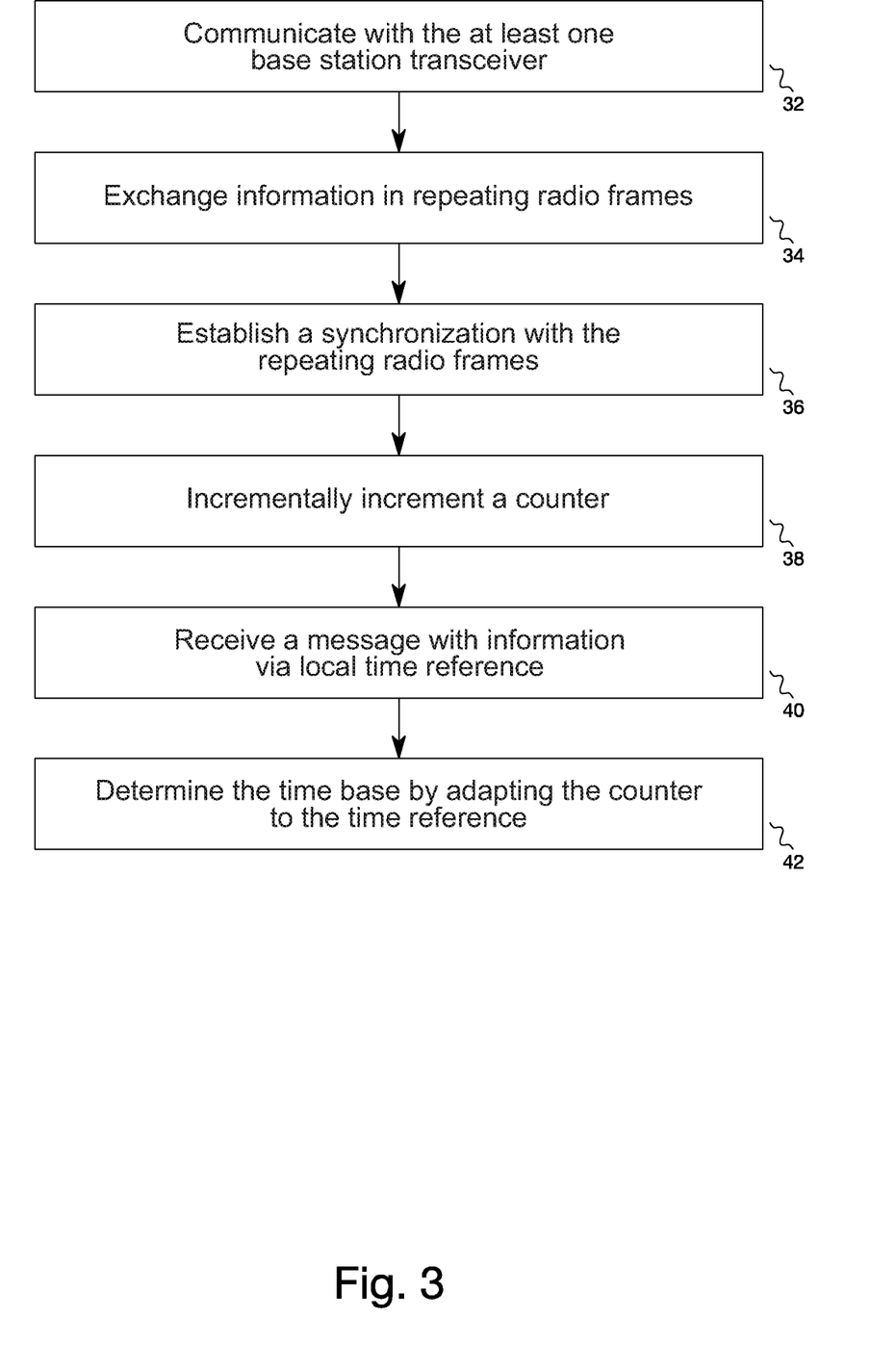
FIG. 3 shows a block schematic of a flow chart of an embodiment of a method for a mobile transceiver.

FIG. 3 shows a block schematic of a flow chart of an embodiment of a method for a mobile transceiver 100. The method is adapted for determining a time base in a mobile transceiver 100 in a mobile communication system 300. The mobile communication system 300 comprises at least one base station transceiver 200. The method includes communicating 32 with the at least one base station transceiver 200 of the mobile communication system 300 and an exchanging 34 of information in repeating radio frames with the base station transceiver 200. The method further comprises establishing 36 synchronization with the repeating radio frames and incrementally incrementing 38 a counter. The method further comprises receiving 40 a message from the at least one base station transceiver 200. The message includes information on a local time reference at the base station transceiver 200. The method further includes determining 42 the time base by adjusting the counter based on the information on the local time reference.

Figure 4:
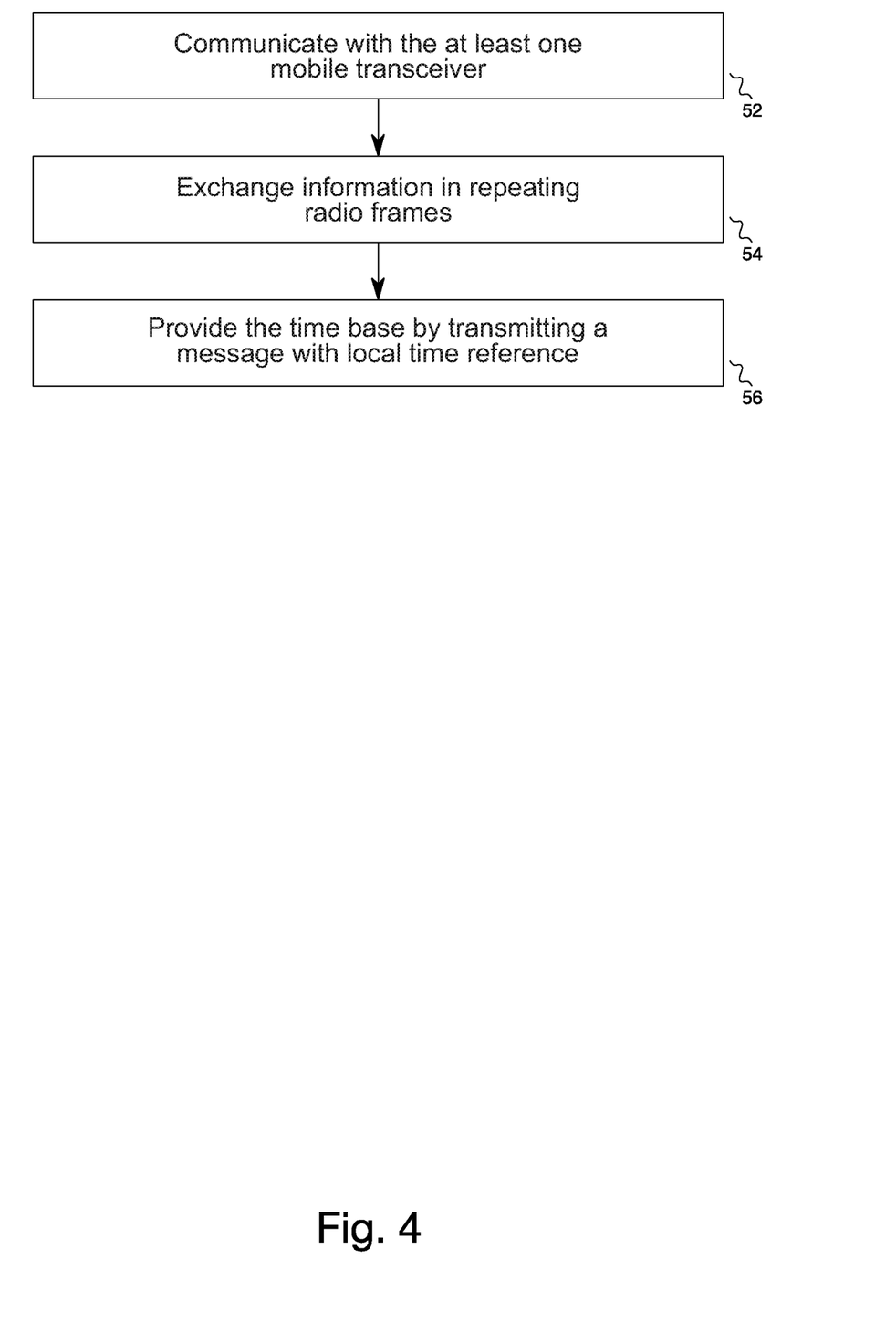
FIG. 4 shows a block schematic of a flow chart of an embodiment of a method for a base station transceiver.

FIG. 4 illustrates a block schematic of a flow chart of an embodiment of a method for a base station transceiver 200. The method for transmitting a time base from a base station transceiver 200 to a mobile transceiver 100 in a mobile communication system 300 includes communicating 52 with the at least one mobile transceiver 100 and exchanging 54 information in repeating radio frames with the mobile transceiver 100. The method includes providing 56 the time base by sending a message from the at least one base station transceiver 200 to the mobile transceiver 100. The message includes information on a local time reference relative to the repeating radio frames.

A further embodiment is a computer program for executing at least one of the above described methods when the computer program is running on a computer, a processor, or a programmable hardware component. A further embodiment is a digital storage medium which is machine or computer readable and comprises the electronically readable control signals which may cooperate with a programmable hardware component so that one of the above described methods is executed.

The features disclosed in the above description, the subsequent claims and the accompanying figures may be important and implemented in their various forms either individually or in any combination for the realization of an embodiment.

Although some aspects have been described in connection with a device, it is understood that these aspects also represent a description of the corresponding process, so that a block or component of a device is also to be understood as a corresponding method step or as a feature of a method step. Similarly, aspects described in connection with a method step also represent a description of a corresponding block or detail or feature of a corresponding device.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, a hard disc or another magnetic or optical memory having electronically readable control signals stored thereon, which cooperate or are capable of cooperating with a programmable hardware component such that the respective method is performed.

A programmable hardware component may be formed by a processor, a Central Processing Unit (CPU), a Graphics Processing Unit (GPU), a computer, a computer system, an Application-Specific Integrated Circuit (ASIC), an Integrated Circuit (IC), a System on Chip (SOC), a programmable logics element or a Field Programmable Gate Array (FPGA) comprising a microprocessor.

Therefore, the digital storage medium may be machine or computer readable. So, some embodiments include a data carrier comprising electronically readable control signals which are capable of cooperating with a programmable computer system or a programmable hardware component such that one of the methods described herein is performed. One embodiment is thus a data carrier (or a digital storage medium or a computer readable medium) on which the program for executing of the methods described herein is stored.

Generally speaking, embodiments of the present invention may be implemented as a program, firmware, a computer program or a computer program product having a program code or as data, wherein the program code or the data is effective to execute one of the methods when the program is executed on a processor, or a programmable hardware component. The program code or the data may, for example, also be stored on a machine-readable carrier or data carrier. The program code or the data may among others be present as a source code, machine code or byte code or any other intermediate code.

A further embodiment is a data stream, a signal sequence or a sequence of signals which may represent the program for executing one of the methods described herein. The data stream, the signal sequence or the sequence of signals may for example be configured so as to be transferred via a data communication connection, for example via the internet or another network. Embodiments thus also are signal sequences representing data suitable for being transferred via a network or a data communication connection, the data representing the program.

A program according to one embodiment may implement one of the methods during its execution for example by reading out memory locations or writing one or several data into the same, whereby possibly switching processes or other processes in transistor structures, in amplifier structures or in other electrical, optical, magnetic or other members operating according to another functional principle are caused. Accordingly, by reading out a memory location, data, values, sensor values or other information is determined, detected or measured by a program. By reading out one or several memory locations, a program may detect, determine or measure magnitudes, values, measured quantities and other information and, by writing into one or several memory locations, cause, trigger or execute an action and control other devices, machines and components.

The embodiments described above are merely an illustration of the principles of the present invention. It is understood that modifications and variations of the arrangements and the details described herein will be apparent to others skilled in the art. Therefore, it is intended that the invention is limited only by the scope of protection of the claims below and not by the specific details presented in the description and explanation of the embodiments herein.

The invention claimed is:

1. A device for determining a time base in a mobile transceiver in a mobile communication system, wherein the mobile communication system comprises at least one base station transceiver and wherein the mobile transceiver is configured to exchange information in repeating radio frames with the base station transceiver, comprising:
at least one interface configured to communicate with the at least one base station transceiver of the mobile communication system; and
a control module configured to:
control the at least one interface,
establish a synchronization with the repeating radio frames,
increment a counter incrementally,
receive a message from the at least one base station transceiver, the message comprising information on a local time reference at the base station transceiver, wherein the information on the local time reference includes
an absolute time stamp; and
identification information on a radio frame of the repeating radio frames standing in temporal relation to the absolute time stamp, and
adapt the counter to determine the time base based on the absolute time stamp and the identification information on the radio frame of the repeating radio frames standing in temporal relation to the absolute time stamp.

2. The device according to claim 1, wherein the absolute time stamp is in the past.

3. The device according to claim 1, wherein the absolute time stamp is in the future.

4. The device according to claim 1, wherein the control module is configured to determine information on a signal runtime between the base station transceiver and the mobile transceiver with respect to the synchronization with the repeating radio frames, wherein the control module is further configured to take the information on the signal runtime into account in determining the time base.

5. The device according to claim 1, wherein the control module is further configured to sample or reproduce signal values based on the time base.

6. The device according to claim 5, wherein the signal values comprise audio or video signals.

7. The device according to claim 1, wherein the absolute time stamp is a time stamp according to the Precision Time Protocol.

8. A system for time-synchronously sampling or reproducing signals by means of two or more mobile transceivers, comprising the two or more mobile transceivers each comprising a device according to claim 1 and at least one base station transceiver comprising a device for transmitting a time base from a base station transceiver to a mobile transceiver in a mobile communication system, comprising:
at least one transceiver module configured to communicate with the at least one mobile transceiver; and
a control module configured to:
control the transceiver module,
exchange information in repeating radio frames with the mobile transceiver via the transceiver module,
send a message from the at least one base station transceiver to the mobile transceiver, wherein the message comprises information on a local time reference relative to the repeating radio frames, so as to provide the time base.

9. A non-transitory machine-readable storage medium comprising electronically readable control signals, which, when cooperating with a programmable hardware component, execute a method for determining a time base in a mobile transceiver in a mobile communication system, wherein the mobile communication system comprises at least one base station transceiver;
the method comprising:
communicating with the at least one base station transceiver of the mobile communication system,
exchanging information in repeating radio frames with the base station transceiver,
establishing a synchronization with the repeating radio frames,
incrementally incrementing a counter,
receiving a message from the at least one base station transceiver, the message comprising information on a local time reference at the base station transceiver, wherein the information on the local time reference includes
an absolute time stamp; and
identification information on a radio frame of the repeating radio frames standing in temporal relation to the absolute time stamp, and
determining the time base by adapting the counter to determine the time base based on the absolute time stamp and the identification information on the radio frame of the repeating radio frames standing in temporal relation to the absolute time stamp.

* * * * *